Figures 1, 2, 3:
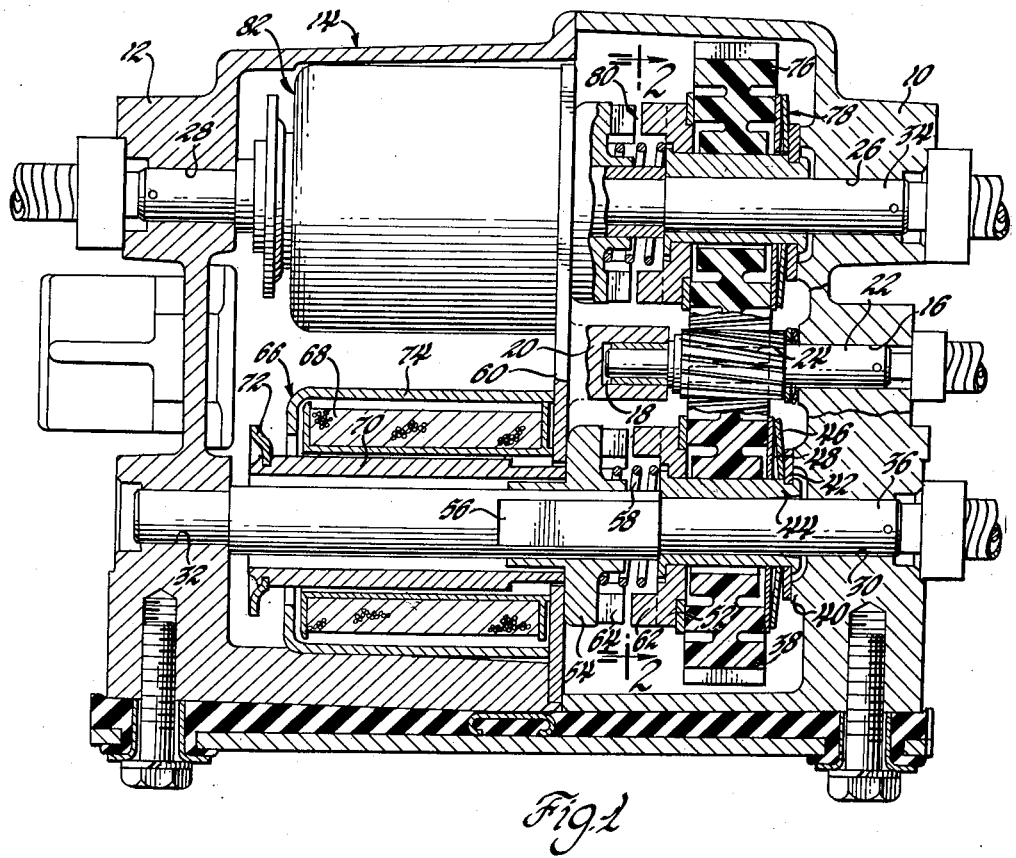

Jan. 15, 1963  T. E. LOHR  3,073,180
POWER TRANSMISSION MECHANISM
Filed July 8, 1960

INVENTOR.
Thomas E. Lohr
BY
R. P. Barnard
ATTORNEY

United States Patent Office 3,073,180
Patented Jan. 15, 1963

3,073,180
POWER TRANSMISSION MECHANISM
Thomas E. Lohr, Detroit, Mich., assignor to General Motors Corporation, Detroit, Mich., a corporation of Delaware
Filed July 8, 1960, Ser. No. 41,520
6 Claims. (Cl. 74—665)

The present invention relates to a new and improved transmission device of the type including a single power input shaft and a plurality of power output shafts. More specifically, the present invention relates to such a device in which the output shafts may be selectively coupled to the input shaft.

While transmission devices having multiple power output shafts are broadly old, the subject transmission is extremely compact, durable, and flexible in use. The present transmission device is particularly adapted for use in environments where space limitations are severe such as found in power actuated seat devices or in vehicle tail gate operating mechanisms the latter of the type shown in Patent No. 3,004,757.

In the present device, each output shaft includes a clutch mechanism for coupling the shaft to the input shaft and a slip coupling device for automatically uncoupling the output and input shafts in the event the torque loads exceed a predetermined value. The clutch device is adapted to be selectively actuated by a solenoid mechanism in such a way that one or a plurality of output shafts may be operated through a single motor mechanism.

The details as well as other objects and advantages of the present invention will be apparent from a perusal of the detailed description which follows.

In the drawings:
FIGURE 1 is a sectional plan view of the subject invention;
FIGURE 2 is an end elevational view of the invention; and
FIGURE 3 is an exploded view of the solenoid clutch.

A pair of casing members 10 and 12 are adapted to be joined along their open ends to provide a housing for the subject transmission mechanism indicated generally at 14. Casing 10 includes a centrally disposed opening 16 therethrough which is aligned with a similar opening 18 formed in a casing boss 20. A power input shaft 22 is adapted to be rotatably supported within openings 16 and 18. A pinion gear 24 is formed on shaft 22.

Casings 10 and 12 also include axially aligned openings 26—28 and 30—32 adapted to rotatably support power output shafts 34 and 36 therein. The axes of output shafts 34 and 36 are parallel to the axis of input shaft 22. Inasmuch as the construction and operation of the mechanism for transmitting power from input shaft 22 to output shafts 34 and 36 is identical, it will suffice to merely describe one of said mechanisms.

A gear member 38 is coaxially mounted on output shaft 36 and is rotatable relative thereto. An annular shoulder 40 is formed on casing 10 adjacent one end of output shaft 36 and is abuttingly engaged by a washer member 42 fixed to a sleeve member 44 rotatably supported on the shaft. A Belleville washer coupling device is disposed between the washer 42 and the adjacent face of gear member 38. A Belleville washer coupling includes plates 46 and 48 which are assembled betwen the washer 42 and the adjacent face of gear 38 with sufficient frictional force to normally provide a drive connection between the gear and sleeve 44. Thus gear 38 which is constantly in mesh with input gear 24 will be rotated with the input shaft and in turn impart a similar rotation to sleeve 44. The other end of sleeve 44 includes a flange portion which supports or is integral with a clutch member 52 fixed for rotation with said sleeve. A second clutch member 54 preferably of anti-magnetic material is fixed to output shaft 36 for rotation therewith through a flatted portion 56 so as to be axially movable relative to the output shaft. Clutch members 52 and 54 are hollowed to receive a spring member 58 which biases slidable clutch member 54 axially away from clutch member 52 to seat against a wall 60 supported between casings 10 and 12. Clutch members 52 and 54 include teeth members 62 and 64 adapted to be engaged whereby the rotative movement of gear 38 will be transmitted to output shaft 36.

A solenoid 66 is mounted on wall 60 coaxially with output shaft 36 which extends axially therethrough. Solenoid 66 includes a coil 68 and an armature 70. The lower end of armature 70 includes a washer 72 fixed thereto and adapted to abut against solenoid casing 74 to limit the axial movement of the armature. The other end of armature 70 is secured to or abuts against clutch member 54.

The operation of the device is as follows: assuming input shaft 22 is rotated by any suitable motor source, and with the parts in the position shown in FIGURE 1, gear 38 will be rotated and in turn impart rotation to clutch member 52. With solenoid 66 de-energized, spring 58 will maintain clutch member 54 out of engagement with clutch member 52 and therefore no rotation will be imparted to output shaft 36. However, upon energization of solenoid 66 armature 70 will move clutch member 54 axially permitting meshing engagement of teeth 62—64 whereby the rotation of input shaft 22 and gear 38 will be transmitted through the Belleville and solenoid clutch devices to output shaft 36. Any suitable power take-off members, such as the flexible drive shafts shown in the aforenoted copending application, may be connected to either end of output shaft 36 and in this way at least two devices may be driven thereby.

In the event the torque load on shaft 36 exceeds a predetermined value, Belleville coupling plate members 44 and 46 will begin to slip relative to either gear 38 or washer 42 thereby interrupting the transmission of drive from gear member 38 to sleeve 44 until such time as the torque load is reduced sufficiently at which time drive will be resumed.

The other output shaft 34 is adapted to be coupled in the same manner through gear 76, Belleville coupling 78 and clutch 80 to input shaft 22 when solenoid 82 is energized. Here again suitable output drive members may be connected to either end of output shaft 34 providing, in the form of the invention shown, a total of four output drives from a single input shaft and which drives may be selectively coupled to the input shaft through the energization of solenoids 66 and 82.

I claim:
1. A power transmission device comprising casing means, a power input shaft rotatably supported within said casing means, a plurality of power output shafts rotatably supported within said casing means, a gear member fixed for rotation with said input shaft, a plurality of rotatable gear members respectively coaxially mounted on said output shafts for rotation relative thereto, said plurality of rotatable gear members continuously meshing with the gear member on said input shaft, a sleeve mounted for rotation relative to each output shaft and disposed between each rotatable gear member and its associated output shaft, a slip coupling device for drivably connecting each of said rotatable gear members and its associated sleeve, and a clutch device for drivably connecting each sleeve and its respective output shaft.

2. A power transmission device comprising casing means, a power input shaft rotatably supported within said casing means, a plurality of power output shafts rotatably supported within said casing means, a gear member fixed for rotation with said input shaft, a plurality of rotatable gear members respectively coaxially mounted on said output shafts for rotation relative thereto, said plurality of rotatable gear members continuously meshing with the gear member on said input shaft, a sleeve mounted for rotation relative to each output shaft and disposed between each rotatable gear member and its associated output shaft, a slip coupling device for drivably connecting each of said rotatable gear members and its associated sleeve, a clutch means for drivably connecting each sleeve and its respective output shaft, and a solenoid for energizing each clutch means to effect drive between each respective sleeve and shafts.

3. A power transmission device comprising casing means, a power input shaft rotatably supported within said casing means, a plurality of power output shafts rotatably supported within said casing means on rotative axes parallel to the rotative axis of the input shaft, a gear member fixed for rotation with said input shaft, a rotatable gear member coaxially mounted on each output shaft for rotation relative thereto, each of said coaxially mounted rotatable gear members continuously meshing with the input shaft gear, a sleeve mounted for rotation relative to each output shaft and disposed between each rotatable gear member and the associated output shaft, friction coupling devices for respectively drivably connecting said rotatable gear members and said sleeves, solenoid clutch devices for respectively drivably connecting said sleeves and said output shafts.

4. A power transmission device as set forth in claim 3 in which the friction coupling is adapted to slip and interrupt the drive between said rotatable gear member and said sleeve when the torque load on the associated output shaft exceeds a predetermined value.

5. A power transmission device as set forth in claim 2 in which the clutch includes a first toothed member fixed to said sleeve, a second toothed member mounted for rotation with the output shaft and axially slidable relative thereto, a spring biasing the second member out of engagement with the first member, said solenoid means adapted to mesh the second toothed member with the first toothed member against the force of said spring.

6. A power transmission device as set forth in claim 5 in which the solenoid is coaxially mounted relative to the associated output shaft permitting the latter to extend axially therethrough, the solenoid including an armature engageable with the second toothed member.

References Cited in the file of this patent
UNITED STATES PATENTS

| | | |
|---|---|---|
| 1,910,125 | Root | May 23, 1933 |
| 2,724,281 | Summers | Nov. 22, 1955 |
| 2,782,813 | Dudek | Feb. 26, 1957 |
| 2,834,620 | Maude | May 13, 1958 |
| 2,859,845 | Bachman | Nov. 11, 1958 |
| 2,933,939 | Brandt | Apr. 26, 1960 |